(12) United States Patent
Yacobi et al.

(10) Patent No.: US 8,015,177 B2
(45) Date of Patent: Sep. 6, 2011

(54) PERFORMING A COLLABORATIVE SEARCH IN A COMPUTING NETWORK

(75) Inventors: Yacov Yacobi, Mercer Island, WA (US); Jim Kajiya, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 12/272,801

(22) Filed: Nov. 18, 2008

(65) Prior Publication Data

US 2010/0005089 A1    Jan. 7, 2010

Related U.S. Application Data

(60) Provisional application No. 61/078,068, filed on Jul. 3, 2008, provisional application No. 61/094,861, filed on Sep. 5, 2008.

(51) Int. Cl.
    *G06F 17/30* (2006.01)
(52) U.S. Cl. ...................................................... 707/713
(58) Field of Classification Search .............. 707/3, 687, 707/713; 709/223
    See application file for complete search history.

(56) References Cited

U.S. PATENT DOCUMENTS

| | | | |
|---|---|---|---|
| 7,076,655 B2 | 7/2006 | Griffin et al. | |
| 7,213,047 B2 | 5/2007 | Yeager et al. | |
| 7,383,433 B2 | 6/2008 | Yeager et al. | |
| 7,415,617 B2 | 8/2008 | Ginter et al. | |
| 7,707,192 B1 * | 4/2010 | Lu et al. | 707/687 |
| 2005/0261956 A1 | 11/2005 | Kato | |
| 2007/0124191 A1 | 5/2007 | Haller et al. | |
| 2007/0124579 A1 | 5/2007 | Haller | |
| 2007/0185841 A1 * | 8/2007 | Jones et al. | 707/3 |
| 2007/0208613 A1 | 9/2007 | Backer | |
| 2008/0005064 A1 * | 1/2008 | Sarukkai | 707/3 |
| 2008/0016195 A1 | 1/2008 | Tulshibagwale et al. | |

OTHER PUBLICATIONS

Xing, "Internet Search Engine Result Diversity, Relevance, Quality, and the Effects of Search Engine Optimization", A Dissertation in Business Administration (Management Information Systems). Submitted to the Graduate Faculty of Texas Tech University Dec. 2006.
Shannon, "A Mathematical Theory of Communication", The Bell System Technical Journal, vol. 27, pp. 379-423, 623-656, Jul. Oct. 1948.
Josang, "An Algebra for Assessing Trust in Certification Chains", proceedings of NDSS'99, Network and Distributed Systems Security Symposium, The Internet Society, San Diego 1999. pp. 1-10.
Shannon, "Communication Theory of Secrecy Systems", The material in this paper appeared in a confi dential report "A Mathematical Theory of Cryptography" dated Sep. 1, 1946, which has now been declassified. pp. 656-715.
Blaze, et al., "Decentralized Trust Management", Originally published in Proceedings of IEEE Conference on Security and Privacy, Oakland, CA. May 1996. 10 Pages.

(Continued)

*Primary Examiner* — Etienne P LeRoux
(74) *Attorney, Agent, or Firm* — Thorpe North & Western LLP

(57) ABSTRACT

Method for performing a collaborative search in a computing network. In one implementation, the method may include receiving a search criteria from a user, identifying one or more agents who have performed a search using the search criteria, the agents and the user belonging to the computing network, identifying one or more search results that the agents have previously selected as being relevant to the search criteria, ranking the search results, and displaying the search results according to the ranking.

17 Claims, 2 Drawing Sheets

OTHER PUBLICATIONS

Maurer, "Modelling a Public-Key Infrastructure", Appeared in Proceedings of European Symposium on Research in Computer Security (ESORICS '96) E. Bertino (Ed.), Lecture Notes in Computer Science Berlin, Springer-Verlag vol. 1146. pp. 325-350, 1996.

Canetti, "Security and Composition of Multiparty Cryptographic Protocols", Journal of Cryptology (2000)13: pp. 143-202.

Blaze, et al., "The Role of Trust Management in Distributed Systems Security", Lecture Notes in Computer Science State-of-the-Art series, 1999. 27 Pages.

* cited by examiner

PERFORMING A COLLABORATIVE SEARCH IN A COMPUTING NETWORK

CROSS-REFERENCE TO RELATED APPLICATIONS

This application claims priority to U.S. provisional patent application Ser. No. 61/078,068, filed Jul. 3, 2008, titled METHOD FOR QUANTIFYING TRUST, which is incorporated herein by reference.

This application claims priority to U.S. provisional patent application Ser. No. 61/094,861, filed Sep. 5, 2008, titled TRUST AND COLLABORATION, which is incorporated herein by reference.

BACKGROUND

As digital communications, networks, and transactions increase, the need became apparent for ways in which computer users could "trust" each other. Digital trust systems, such as Public Key Infrastructure (PKI), build trust hierarchies, such as the "Web of Trust", so that users could securely communicate with each other, authenticate the identities of each other, and determine the integrity of the messages received from each other. In addition to securing communications, authenticating identities, and determining message integrity, similar trust characteristics may be used by digital search services to help users locate specific items in digital information system environments. Current search algorithms rank search results in a variety of methods including accounting for the number of hyperlinks that direct a user to specific webpage. However, these methods fail to take into account the actions and preferences of each individual user or his preferred ranking of the search results.

SUMMARY

Described herein are implementations of various technologies directed to performing a collaborative search in a computing environment connected to a digital network or system. In one implementation, a search service may be configured to analyze the previous searches of past search service users or agents to perform a new search on a computing network. The search service may exist on a computing network such as a server accessible via the Internet, and it may be configured to receive a request to locate a specific item that may be stored on the computing network. The search service may then receive one or more search criteria from a user to assist in locating the specific item from the digital information network. The search service may cross reference the received search criteria with previous search criteria of previous search service agents.

Upon locating one or more agents in the computing network that may have performed a search using the same search criteria as the current user, the search service may determine a gap or discrepancy value for each of the agents that performed an identical search. In one implementation, a search or query is a pair of variables (d,U), where d is a deterministic preamble composed of key words and click patterns, and U is a random variable over similar message space. U assigns probabilities to potential future evolvements of the search process. The agents that help the user or active agent with their recommendations all performed previous searches that started with the same deterministic preamble d, but may have distinct U's.

In one implementation, the discrepancy values may describe the discrepancy between the various U's. These discrepancy values are in the interval [0,1]. The smaller the discrepancy values the higher the confidence in the recommendation. Trust or confidence values may then be defined as 1-discrepancy value. Groups of agents are clustered together when their trust values are close to 1 (ie, small gaps). Each cluster may make its own recommendations to the active agent. The discrepancy (or gap or uncertainty) value may relate to an agent's confidence in the one or more previous agents that used the same search criteria. In addition to the discrepancy values, the search service may assign a weight value to each matching agent. The weight value reflects the relative significance of the opinion of an agent on a given matter. The sum of weights is 1 and the weights may relate to the probability that the intended search result of previous agents' search may be identical to that of the intended search result of the current user.

The search service may then group agents with similar discrepancy values together in a cluster. Each cluster may provide the search service with a recommendation for the user that may relate to the user's search criteria. The search service may then list the intended search result of each cluster or previous agent's recommendation according to the confidence and uncertainty values that the user may have in each agent. In addition to the confidence and uncertainty values, the search service may factor in a weight value in each matching agent. The original user may weigh the confidence and uncertainty values of each previous agent differently depending on previous experiences with the agent, other parties' confidence value in the agent, or other characteristics. The search service may iterate through the above described process until the user finds his intended search result. Upon locating his intended search result, the search service may reassess and save the resulting confidence, uncertainty, and weight values of each agent in the computing network for future searches.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to performing a collaborative search in a computing network. One or more implementations of various techniques for performing a collaborative search will be described in more detail with reference to FIGS. 1-2.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
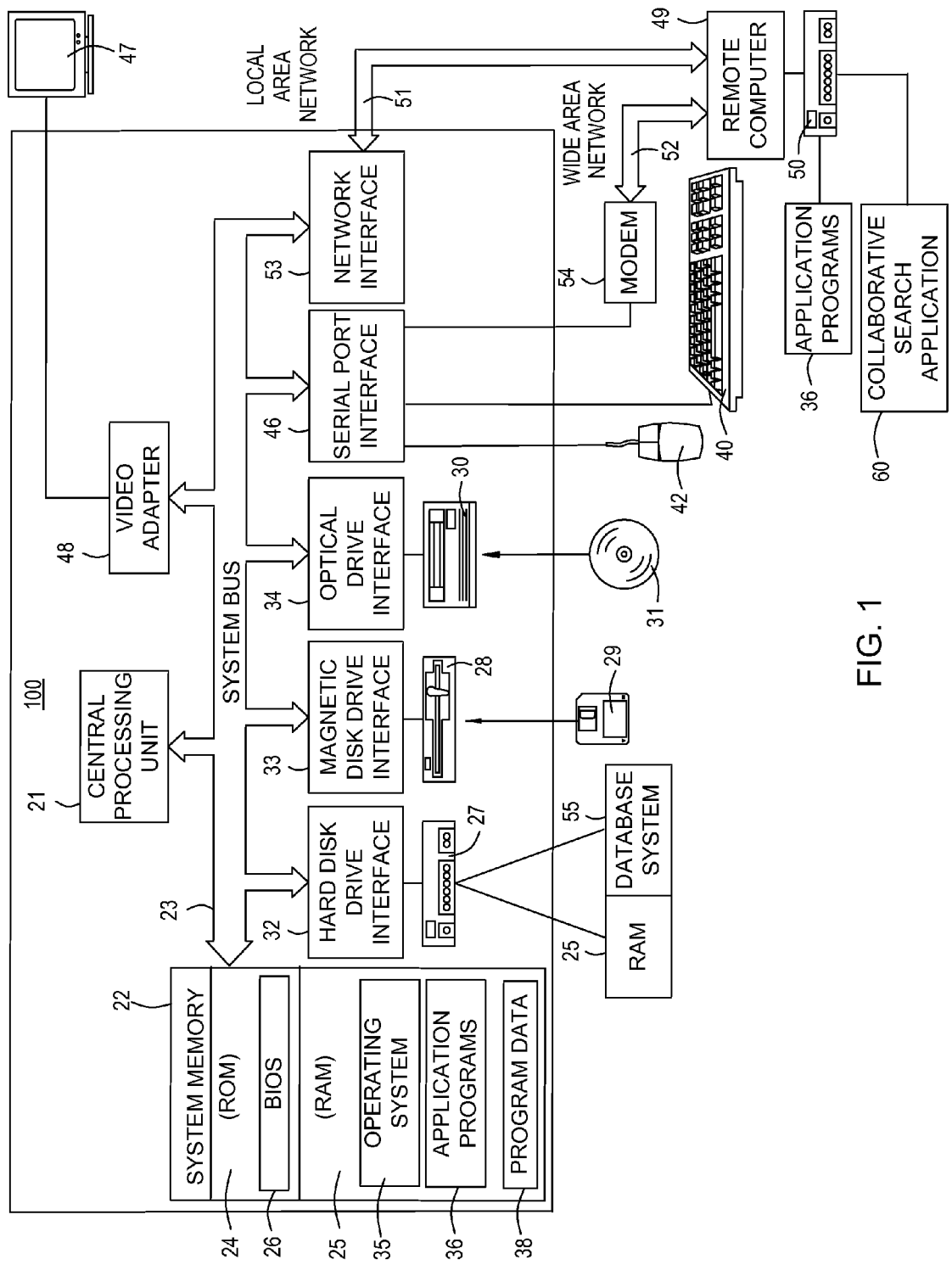
FIG. 1 illustrates a schematic diagram of a computing system in which the various techniques described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, program data 38, and a database system 55. The operating system 35 may be any suitable operating system that may control the operation of a networked personal or server computer, such as Windows® XP, Mac OS® X, Unix-variants (e.g., Linux® and BSD®), and the like.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. The remote memory storage device 50 may include the collaborative search application 60. In one implementation, the collaborative search application 60 may be stored on the hard disk 27, magnetic disk 29, optical disk 31, ROM 24, or RAM 25. The collaborative search application 60 may perform a search service on the computing network. It will be described in more detail with reference to FIG. 2 below. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
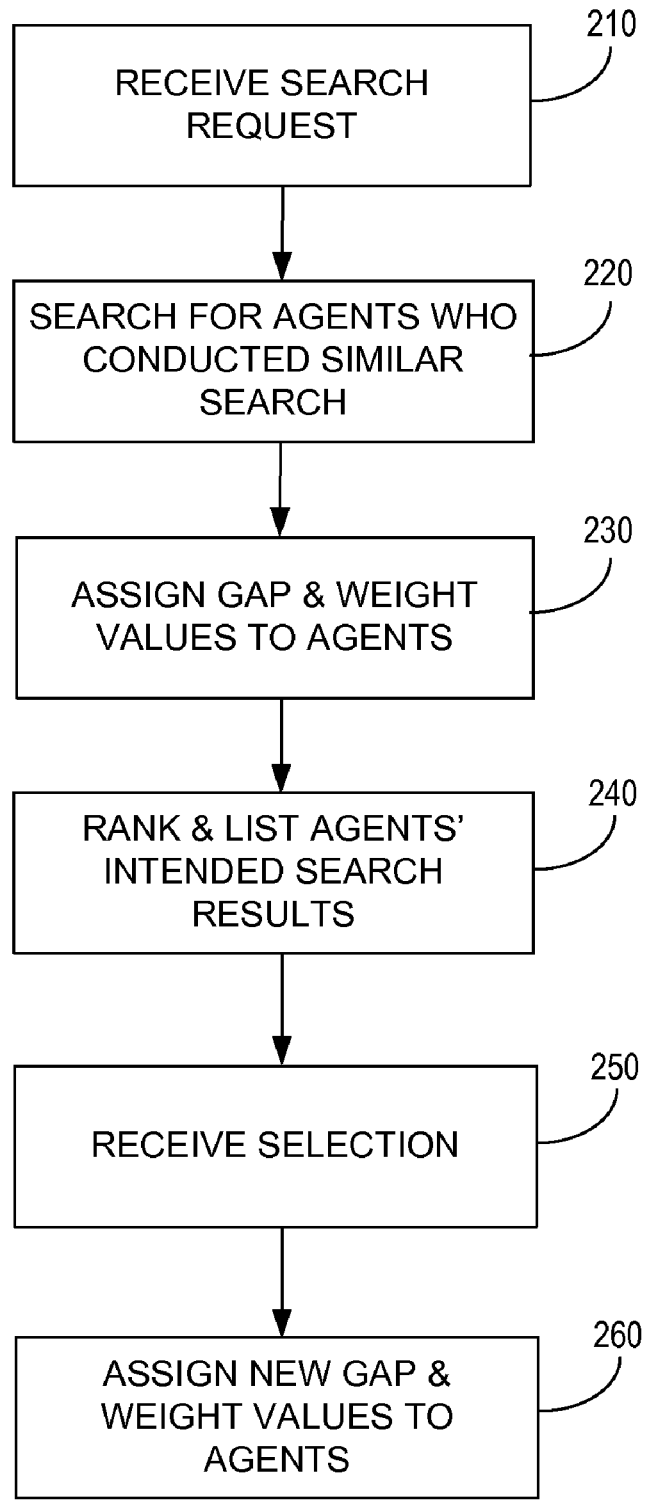
FIG. 2 illustrates a flow diagram of a method for performing a collaborative search in accordance with one or more implementations of various techniques described herein.

FIG. 2 illustrates a flow diagram of a method 200 for performing a collaborative search on a computing network in accordance with one or more implementations of various techniques described herein. The following description of method 200 is made with reference to computing system 100 of FIG. 1 in accordance with one or more implementations of various techniques described herein. It should be understood that while the operational flow diagram indicates a particular order of execution of the operations, in some implementations, certain portions of the operations might be executed in a different order. In one implementation, method 200 for performing a collaborative search may be performed by the collaborative search application 60.

At step 210, the collaborative search application 60 may receive a request to perform a search from a user. In one implementation, the user may be searching for a webpage, an image, or information that may be stored on a computing network. The collaborative search application 60 may be stored on a server that may provide a search service, and it may have access to the computing network via the server. A user may input his request to perform a search by entering certain search criteria in a text field that may be provided by the collaborative search application 60. The search criteria may include words that may describe the item for which the user may be searching. For example, if the user is in search of information pertaining to New York City, he may use the words "New York" as the search criteria for the collaborative search application 60.

At step 220, the collaborative search application 60 may cross reference the user's search criteria with the search criteria of previous agents in the computing network. Agents may represent one or more users that may have previously performed a search in the computing network. In one implementation, the collaborative search application 60 may require that the search criteria of the current user and the previous agents match in an exact fashion (order, spelling, etc.), but it should be noted that the collaborative search application 60 may also allow for a degree of difference in search criteria. In one implementation, each agent may store its search history on its local hard drive or on any type of memory storage device. When a user initiates a new search, the collaborative search application 60 may search the memory storage device of the agents that may have performed a similar search in the past. The agents that may have performed a similar search as that of the user may be defined as part of a clique or cluster. In one implementation, the agents whose search histories may be stored in a memory storage device may have granted the collaborative search application 60 permission to store and use information pertaining to their search histories in accordance with implementations described herein.

At step 230, the collaborative search application 60 may assign a discrepancy value for the agents that had similar search criteria. In one implementation, the collaborative search application 60 may assign an extremely low discrepancy value, or gap value, to those agents who had search criteria that matched exactly that of the current user. The search performed by a user may be described as a pair (d,U), where d is a deterministic preamble composed of key words or search criteria (received at step 210) used for a search or click patterns used to locate a search result, and U is a random variable over a message space describing an agent's past searches that started with the deterministic preamble d. U can be viewed as a probabilistic tree whose root is the last symbol of the deterministic preamble d, and whose leaves are past successful search targets. The history of agents is used to predict the future evolvement of the active user.

In one implementation, if the agents performed searches in the past that started with the same deterministic preamble d as the active agent, the agents may provide the user with one or more recommendations about the user's search request. The collaborative search application 60 may then compute a discrepancy value to quantify the differences between any two agents that agree on the deterministic preamble d. The discrepancy value is computed over their respective U's, using the function $D(U_i, U_j)$, described in the next paragraph. The active agent (the user) may or may not have a known U. The more information the engine has about the U of an agent, the higher the weight of that agent. The discrepancy values are in the interval [0, 1]. The smaller the discrepancy value that may exist between an active agent and an agent the higher the active agent's confidence may be in the agent's recommendation. Trust or confidence values in an agent may be defined as 1-discrepancy value. The collaborative search application 60 may form one or more clusters containing a group of agents having trust values close to 1 (i.e., with small gaps). Each cluster may make its own recommendations to the active agent.

In one implementation the discrepancy value may be a derivative of the conditional entropies that may be defined as $D(X,Y)=H(X|Y)/H(X,Y)+H(Y|X)/H(X,Y)$ where $H(X|Y)$ is conditional entropy of X given Y and $H(X,Y)$ is their mutual entropy. These conditional entropies gauge the discrepancy or gap between random variables $U_i$ and $U_j$ in order to create clusters of "like minded" agents. $D(X,Y)$ is a metric over the message space containing one or more random variables U. The collaborative search application 60 may determine a discrepancy value $D(U_i,U_j)$ for each pair of agents based on their random variables $U_i$ and $U_j$.

For example, if the user used the search criteria "New York" to locate information on New York City, the collaborative search application 60 may identify ten agents that may have performed a previous search using the same search criteria "New York." In this example, "New York" may be the deterministic preamble d. The collaborative search application 60 may locate one or more agents that may have performed a search with the same deterministic preamble d. Depending on what each agent with the same deterministic preamble d selected as his search result (U), the collaborative search application 60 may calculate a discrepancy value between any pair of those agents (the active agent=user being one of them) with the same deterministic preamble d. The collaborative search application 60 assigns a low discrepancy value for each of the ten agents that performed a previous search using the same search criteria to each pair of agents that selected similar search result. Therefore, the confidence value of each of these agents in each other may be close to 1 because the discrepancy values are low. In one implementation, the collaborative search application 60 may cluster the ten agents with similar selections U together. The collaborative search application 60 may receive a recommendation from a cluster based on weighted averages.

If four of these agents intended to locate information on New York City and the other six agents may have intended to locate information on the state of New York, the two groups of agents may still have one or more different intended search results. For example, the four agents who intended to locate information on New York City may have four different intended search results pertaining to New York City such as Central Park, the Empire State building, the World Trade Center, and the New York subway system. If each of these four agents access a different website related to Central Park, the Empire State building, the World Trade Center, and the New York subway system, then the collaborative search application 60 may let d="New York", and U be a probabilistic tree where all the agents that proceed with "Central Park" have central park tree U that proceeds to split probabilistically to various results about central park. Likewise all the agents that proceed with the "Empire State building" may have probabilistic trees U's whose root is the "Empire State" but may proceed to split probabilistically to various results about its root. The collaborative search application 60 may cluster the agents that agree on the deterministic preamble d based on the similarity of their probabilistic trees U. In one implementation, the leaves of the trees are recommendations of each agent within the cluster. These recommendations are ranked based on their relative average probabilities within a cluster.

Initially, the collaborative search application 60 may be equally uncertain that the intended search result of each agent is identical to that of the current user because it may not have information about past searches of the ten agents. Therefore, the collaborative search application 60 may determine that each agent may have a high discrepancy value (e.g. 90%).

In one implementation, the collaborative search application 60 may also assign a weight value for each agent. If the user and one or more agents consistently have the same search criteria and intended search results, the collaborative search application 60 may assign more weight to the actions of the one or more agents when performing a search for the user. However, the collaborative search application 60 may initially assign each agent with high confidence values equal weights due to lack of knowledge of the user and an agent's intended search results. For example, if ten other agents in the computing network performed a search with the same search criteria and six of those ten agents had the same intended search result while the other four agents had a different intended search result, the intended search result of those six agents may be listed on top if each agent was given an equal amount of weight by the collaborative search application 60. However, if the collaborative search application 60 assessed one agent, outside the six in the majority, with a higher weight value than the others, the final search result of the agent with the highest weighted value may be listed on top. In one implementation, if an agent does not have a history by which the collaborative search application 60 can define its U, his weight value may be low because of this scarce known history.

In one implementation, the weight value given to each agent's search results may be independent of the confidence or uncertainty values. For example, the confidence of agent i in agent k (as computed by i) may have the form:

$$t\_\{ik\} = \frac{1}{n}\sum_{j=1}^{n} w\_\{ij\} \cdot t\_\{ij\} \cdot t\_\{jk\}$$

where t_{ik} is trust of agent i in agent k, t_{ij} is trust of agent i in agent j, t_{k} is trust of agent j in agent k, and w_{ij} is the weight that agent i assigns to agent j.

Although it has been described herein that the collaborative search application 60 may assess the weight value that a user may have for another agent, it should be noted that in one implementation the user may assess the weight value that he may use for another agent. In another implementation, the collaborative search application 60 may assess the weight value that a user may have for another agent by analyzing other users' weight value in the agent.

At step 240, the collaborative search application 60 may present to the user cliques of agents that agree on the deterministic preamble d with each clique clustered based on their U's. The collaborative search application 60 may represent a clique according to the rankings of the intended search results of the agents based on each agent's confidence and weight values. In one implementation, the collaborative search application 60 may examine each cluster's (or clique's) probabilistic tree of selections U and view the leaves of the probabilistic tree of selections U as potential targets of the cluster's search. Each potential target may have its own probability of being selected by the user. The collaborative search application 60 may calculate an average probability of the leaves for the clique with the weight values received at step 230. The collaborative search application 60 may then make recommendations that may be ranked according their probabilities.

In one implementation, let d(τ), a deterministic preamble, denote the search criteria of one or more agents in a network. If U(τ) is defined as a random variable about possible future evolvement, it may represent the uncertainty value described at step 230. The collaborative search application 60 may define the search for similar agents who conducted similar searches as query(τ)=(d(τ), U(τ)). Where τ is the discrete time, and the query is modified by the user as the process is executed. The most important modification is the choosing the next sub cluster. Other modifications are possible, such as new key words, and some new clique patterns. Upon locating one or more agents who conducted similar searches, the collaborative search application 60 may group the agents who conducted similar searches into clusters according to the similarities between their future evolvement U(τ). The collaborative search application 60 may then determine a discrepancy or discrepancy value by evaluating the metric D(Ui, Uj) where Ui is a random variable representing user i's historic searches that started with the deterministic preamble d(τ) and likewise for user j., and D(Ui, Uj) defines the discrepancy value between agent i) who may be conducting the search and agent j) who may have used a similar search criteria or deterministic preamble (d(τ)). The discrepancy value D(Ui, Uj) may be used to define a trust value by subtracting the discrepancy value from one. The consensus may represent an average trust of each agent in a cluster defined by:

$$t\_\{ik\} = \frac{1}{n}\sum_{j=1}^{n} w\_\{ij\} \cdot t\_\{ij\} \cdot t\_\{jk\}.$$

The collaborative search application 60 may determine a cohesion value of each cluster that may be defined as COH=1−max {gap}. The cohesion of a clique may represent how close two agents in a cluster may be to each other by examining the pair of agents in the cluster who may have future evolvement U(τ) that may be the furthest apart. The collaborative search application 60 may then group one or more agents that may use the same search criteria, d(τ), into near max cohesion trust cluster allowing some tolerances disciplined by the following restrictions. Let $N_\tau$ denote the size of the message space of the cluster at round τ (the message space is composed of the targets of the cluster), and let δ(Y) denote the tolerance allowed at round τ, then δ(τ+1)=δ(τ)exp($N_\tau$−$N_{\tau+1}$−1).

At step 250, the collaborative search application 60 may receive a selection from the user pertaining to a particular clique or a particular target of a clique from the list presented at step 240.

At step 260, the collaborative search application 60 may update the discrepancy value between the user and each agent based on the selection received at step 250. In one implementation, the collaborative search application 60 may repeat the discrepancy value calculation process as the user drills deeper into smaller sub cliques, until she chooses a target.

In one implementation, the collaborative search application 60 may receive additional search criteria to help refine the previous search results and to help the user locate his intended search result. In one implementation, the collaborative search application 60 may provide the user with one or more additional information fields to enter additional search criteria to locate his intended search results. After receiving the additional search criteria, the collaborative search application 61 may repeat steps 220-260 as described in the paragraphs above. As a result, the additional search criteria may be used to identify one or more of the agents that may have performed a search with the identical additional search criteria. The confidence and uncertainty values for one or more of the original agents may then change accordingly.

Referring to the example described in step 230, the user uses the search criteria of d(1)="New York", he may be presented with potential clusters (or cliques) titled: "Central park," "Empire State Building," "World Trade Center," etc. After the user selects one of the clusters, his choice may have updated d(1) to create d(2) that may describe the initial search criteria "New York" and the selection of the particular cluster. The collaborative search application 60 may repeat the process as the user selects items further down the probabilistic tree U.

In one implementation, the user may refine his search through the use of links that may be provided by one or more initial search results. For example, the collaborative search application 60 may initially perform a search for "New York" and return ten websites that pertain to the state of New York. In one implementation, each of the ten websites may correspond to leaves of the probabilistic tree U of one or more agents in a cluster. The user may click a link to one of the ten websites and click another link from that website to a website pertaining to New York City which may be his intended search result. In one implementation, the collaborative search application 60 may record the links that the user may have used in locating his intended search result. The collaborative search application 60 may compare the links used by the user to those used by one or more agents and determine the discrepancy, uncertainty, and weight values accordingly.

Referring back to step 250, if the user locates his intended search target, the collaborative search application 60 may again evaluate the one or more agents who had the same intended search results based on the initial and/or the refined search criteria. The collaborative search application 60 may then assign a new discrepancy and weight values to all of the agents who initially had similar search criteria as the user. The new discrepancy, uncertainty, and weight values of the agents may be stored in a memory and used for future searches that may be performed by the user using the collaborative search application 60. In one implementation, the collaborative search application 60 may iterate through the steps described in FIG. 2 after it finds agents that agree on the deterministic preamble d, clusters them into high COH cliques, presents them to the user, and receives a selection from the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing a collaborative search in a computing network, comprising:
   receiving a search criteria from a user;
   identifying one or more agents who have performed a search using the search criteria, the agents and the user belonging to the computing network;
   identifying one or more search results that the agents have previously selected as being relevant to the search criteria;
   calculating one or more confidence values for the one or more agents by calculating one or more probabilities that the one or more agents and the user have identical search results;
   assigning a low discrepancy value to each agent if the probabilities are high, and a high discrepancy value to each agent if the probabilities are low;
   subtracting the low discrepancy values or high discrepancy values from one to form the confidence values;
   ranking the search results based on the confidence values; and
   displaying the search results according to the ranking.

2. The method of claim 1, wherein ranking the search results comprises:
   calculating one or more weight values of the one or more agents; and determining the ranking of the one or more search results based on the confidence values and the weight values.

3. The method of claim 2, wherein calculating the confidence values comprises:
   assigning a low discrepancy value to each agent; and
   subtracting the low discrepancy value from one.

4. The method of claim 3, wherein the discrepancy value is a derivative of conditional entropies.

5. The method of claim 2, wherein calculating the weight values comprises receiving a weight value for each agent from the user.

6. The method of claim 2, wherein calculating the weight values comprises:
   receiving one or more search results of the user;
   comparing the search results of the user with the search results of the agents; and
   assigning higher weight values to one or more agents whose search results are substantially similar to the search results of the user.

7. The method of claim 2, wherein determining the ranking comprises computing a weighted average of the confidence values.

8. The method of claim 7, wherein the weighted average is based on the weight values.

9. The method of claim 1 further comprising:
   receiving a selection of one of the search results from the user; and
   reranking the search results in view of the selection.

10. A method for performing a collaborative search in a computing network, comprising:
   receiving a first search criteria from a user;
   identifying one or more agents who have performed a search using the first search criteria, the agents and the user belonging to the computing network;
   identifying a first set of search results that the agents have previously selected as being relevant to the first search criteria;
   calculating first confidence values for the one or more agents by assigning a discrepancy value to each agent, and subtracting the discrepancy value from one;
   ranking the first set of search results based on the confidence values;
   displaying the first set of search results according to the ranking;
   receiving a second search criteria from the user;
   identifying a portion of the agents who have performed a search using the second search criteria;
   identifying a second set of search results that the portion of the agents have previously selected as being relevant to the second search criteria;
   calculating second confidence values for the one or more agents by assigning a discrepancy value to each agent. and subtracting the discrepancy value from one; and
   ranking the second set of search results based on the second confidence values.

11. The method of claim 10, wherein ranking the first search results comprises:
   calculating one or more confidence values for the one or more agents based on the first search criteria;
   calculating one or more weight values of the one or more agents based on the first search criteria; and
   determining a ranking of the first set of search results based on the confidence values and the weight values.

12. The method of claim 11, wherein ranking the second set of search results comprises:
   recalculating the confidence values for the portion of the agents based on the second search criteria;
   recalculating the weight values of the portion of the agents based on the second search criteria; an
   determining a ranking of the second set of search results based on the confidence values and the weight values.

13. A computer system, comprising:
   a processor;
   a memory comprising program instructions executable by the processor to:
   receive a search criteria from a user;
   identify one or more agents who have performed a search using the search criteria, the agents and the user belonging to a computing network;
   identify one or more search results that the agents have previously selected as being relevant to the search criteria;
   calculate one or more confidence values for the one or more agents by assigning a low discrepancy value to each agent, and subtracting the low discrepancy value from one;
   calculate one or more weight values of the one or more agents; and
   determine a ranking of the search results based on the confidence values and weight values.

14. The computer system of claim 13, wherein the memory further comprises program instructions executable by the processor to display the search results according to the ranking.

15. The computer system of claim 13, wherein the ranking of the search results is based on the confidence values and weight values of the agents.

16. The computer system of claim 13, wherein the discrepancy value is a derivative of conditional entropies.

17. The computer system of claim 13, wherein the ranking is determined by computing a weighted average of the confidence values, wherein the weighted average is based on the weight values.

* * * * *